(12) United States Patent
Meier

(10) Patent No.: US 6,265,654 B1
(45) Date of Patent: Jul. 24, 2001

(54) HYDRAULIC SUPPORT CELL ASSEMBLY

(75) Inventor: Hans-Jürgen Meier, Aalen (DE)

(73) Assignee: Carl-Zeiss-Stiftung, Heidenheim (DE)

( * ) Notice: Subject to any disclaimer, the term of this patent is extended or adjusted under 35 U.S.C. 154(b) by 0 days.

(21) Appl. No.: 09/269,560

(22) PCT Filed: Sep. 6, 1997

(86) PCT No.: PCT/EP97/04853

§ 371 Date: Mar. 30, 1999

§ 102(e) Date: Mar. 30, 1999

(87) PCT Pub. No.: WO98/14817

PCT Pub. Date: Apr. 9, 1998

(30) Foreign Application Priority Data

Sep. 30, 1996 (DE) ............................................. 196 40 204

(51) Int. Cl.$^7$ ...................................................... H05K 5/00
(52) U.S. Cl. .................................. 174/17 LF; 174/17 CT
(58) Field of Search ........................... 174/17 LF, 17 CT

(56) References Cited

U.S. PATENT DOCUMENTS

| 3,992,946 | * | 11/1976 | Bradley | 73/407 R |
| 4,757,982 | | 7/1988 | Rainer et al. | 267/219 |
| 5,074,654 | | 12/1991 | Alden et al. | 359/849 |
| 5,121,904 | * | 6/1992 | Freudenberg | 267/140.1 A |
| 5,151,809 | | 9/1992 | Meier | 359/846 |
| 5,741,001 | * | 4/1998 | Bellamy et al. | 248/634 |

FOREIGN PATENT DOCUMENTS

| 3121961 | 12/1982 | (DE) . |
| 4319453 | 9/1994 | (DE) . |

* cited by examiner

Primary Examiner—Dean A. Richard
Assistant Examiner—Charlie Nguyen
(74) Attorney, Agent, or Firm—Walter Ottesen

(57) ABSTRACT

The invention relates to a thermal compensation device having a thermal compensation cell for a hydraulic support cell that has a working chamber and a compensation chamber. According to the invention, each of the chambers of the support cell is connected to a chamber in the thermal compensation cell. Two tightly interconnected pistons with identical working surfaces press on both chambers in the thermal compensation cell. For this purpose, a lateral support system with a reversing lever having at least one hydraulic cell, which has a work cell and a compensation cell, is used. According to the invention, the rotating axis of the reversing lever is arranged at least in one axis running through a hydraulic cell. Each work chamber and the compensation chamber of the hydraulic cell lie opposite each other. For this purpose, a hydraulic support cell (1) with respective separate work and compensation chambers (5a, 5b) is used, which has a hydraulic cross section of the work chamber (5a) that coincides with the hydraulic cross section of the compensation chamber (5b), both chambers being fitted with sealing joints (4a, 4b). According to the invention, both chambers (5a, 5b) are mounted symmetrically on a base plate (6a), they are interconnected by at least one wrap-around bridge (9) placed outside the chambers (5a, 5b), and a single rigid base plate (6a) is placed between the two chambers (5a, 5b).

13 Claims, 4 Drawing Sheets

HYDRAULIC SUPPORT CELL ASSEMBLY

FIELD OF THE INVENTION

The invention relates to a thermal compensation device for at least one hydraulic support cell, the use of such a thermal compensation device in a lateral support as well as a support cell suitable for carrying out the invention.

BACKGROUND OF THE INVENTION

Under thermal compensation of storage cells, up to now only an arrangement was understood which limits an increase of the oil pressure in the total system as a consequence of a temperature increase. A thermally-caused displacement (for example, of a main mirror in a mirror telescope) was accepted and, if necessary, compensated by focusing the secondary mirror or by readjusting the main mirror.

Known lateral supports with support cells, which lie directly in the line of action of the mirror gravitational plane, function without reversals via levers but can mostly be used only at the outer periphery of the mirror.

By using a lever, the effective plane of the lateral force can, however, be shifted to the rear side of the mirror in the event a lever is used having a fixed pivot point for changing the force direction.

All three points of such a reversing lever should be free of friction forces and have angular-dependent return forces as low as possible. Furthermore, the lateral stiffness should be very high especially of the center joint. For this reason, the stated requirements partially contradict and apparently permit only compromise solutions.

Hydraulic compensation cells (support cells) are known, for example, from European patent publication 0,270,967 or from U.S. Pat. Nos. 4,775,230 and 5,151,809. In these known hydraulic support cells, a center membrane is provided above which the work chamber is configured and below which a compensation chamber lies for the hydrostatic pressure component. Each of the two chambers has a smaller central opening with a seal on the side lying opposite the center membrane. The two chambers are symmetrically built on the two mutually opposite sides of the center membrane in order to obtain the same hydraulic surfaces in both chambers.

Even though such a cell has three sealing systems in the form of membranes (planar membranes or roll membranes), its lateral loadability is so low that a lateral guidance system can only rarely be omitted. Furthermore, roll membranes have unwanted large friction values and spring forces and often become too hard at very low temperatures.

SUMMARY OF THE INVENTION

It is an object of the invention to provide thermal compensation for a hydraulic support cell wherein the compensating system for the hydrostatic pressure, which is anyway present, can simultaneously be used to compensate for the thermally-caused volume change.

The lateral support of the invention permits a reversing lever to be journalled utilizing hydraulic cells so that a movement parallel to itself can take place.

The hydraulic support cell according to the invention has spring stiffness as low as possible and permits a membrane to b omitted, in contrast to the state of the art.

The support cell according to the invention also has an improved lateral guidance behavior compared to the known hydraulic support cells.

The support cell according to the invention has a work chamber and a compensation chamber having the same hydraulic cross section without a seal being arranged between the two chambers.

For this purpose, the two chambers are mirror-image mounted to a non-elastic base plate of the cells which separates the chambers, but the chambers are not connected in the central axis as up to now conventional; rather, they are connected by at least one external wrap-around bridge outside about the two chambers.

The principle is also advantageously applicable for metal bellows as seals or conventional membranes.

The seal membrane can be configured as a metallic torus in the form of an omega. This affords the advantage with respect to a roll membrane that the fixed diameter and the movable diameter of the seal membrane are almost of the same size.

Compared to a flat membrane, the millable surface is larger by factors without the occurrence of a significant reduction of the hydraulic cell stiffness. The mechanical stiffness of the cell (without hydraulic liquid) should, in contrast, be as small as possible.

An omega torus has an especially flat spring characteristic line which runs linearly through the origin.

If three omega leaf springs are arranged each above and below the cell (which are pressed together during their assembly), then the maximum spring energy is stored in the center position. The omega leaf springs output energy with their deflection upwardly as well as downwardly.

The system would snap like a switch from one end position into the other end position without the omega torus. The omega leaf springs have a negative spring characteristic line at the origin which is so selected by the shape of the spring that, for the total system, an essentially still flatter characteristic line results than without the springs. The omega leaf springs simultaneously take on the lateral guidance of the movable parts of the cell whereby an additional lateral guide element is saved.

Further advantageous embodiments of the invention are described in the dependent claims.

BRIEF DESCRIPTION OF THE DRAWINGS

The invention will now be described with reference to the drawings wherein.

DESCRIPTION OF THE PREFERRED EMBODIMENTS OF THE INVENTION

Figure 2:
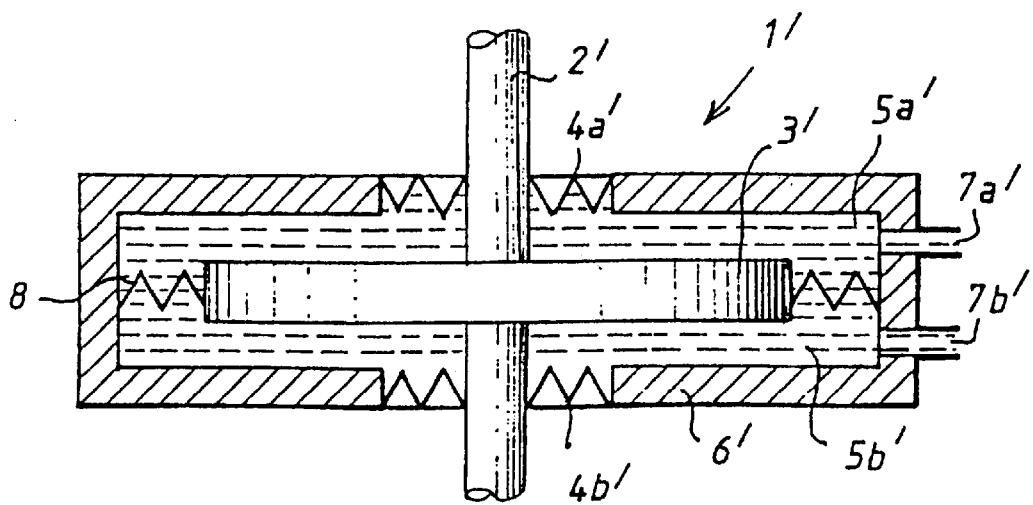
FIG. 2 is a support cell in accordance with the state of the art.

The support cell 1', which is shown in FIG. 2, is a hydraulic support cell according to the state of the art. The hydraulic liquid is accommodated in a housing 6' which is partitioned into two chambers (5a', 5b') by a seal 8 and a partition disc 3'. This support cell 1' is described in detail in DE *3,642,128*.

The upper chamber is the work chamber 5a' and the lower chamber is the compensation chamber 5b'. A feed or connecting line 7a' for hydraulic liquid leads to chamber 5a' and a feed or connecting line 7b' for hydraulic liquid leads to chamber 5b'. The feed or connecting lines can be connected to chambers of other hydraulic actuators.

The housing 6' has a central opening through which the shaft 2' is guided, for example, to a joint (for example, on a mirror). This shaft 2' is sealed with respect to the housing 6' by seals (4a', 4b') above and below the partition disc 3', respectively.

If the shaft 2' presses downwardly, then the pressure in the work chamber 5a' is reduced and the pressure in the compensation chamber 5b' increases. Liquid then flows into chamber 5a' through the feed or connecting line 7a' and out of the chamber 5b' via the feed or connecting line 7b' into the supply vessel (not shown in the figure). In FIG. 2, the work chamber lies below and the compensation chamber above.

Figure 1:
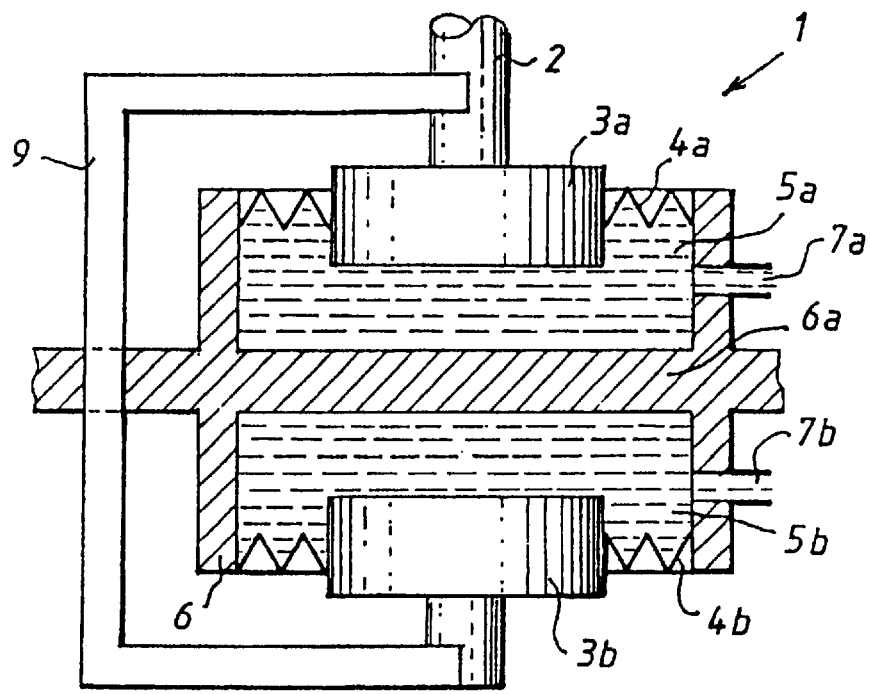
FIG. 1 is a schematic illustration of the new compensating cell according to the invention.

The support cell 1 of the invention is shown in FIG. 1. This support cell 1 has the work chamber 5a above and the compensation chamber 5b below. A feed or connecting line 7a for hydraulic liquid leads to chamber 5a and a feed or connecting line 7b for hydraulic liquid leads to chamber 5b.

A transverse strut 6a (also called a base plate) is disposed between the two chambers (5a, 5b). The transverse strut 6a rigidly separates the two chambers (5a, 5b) from each other. This strut 6a is part of the housing 6.

A piston 3a is mounted in the upper chamber, the work chamber 5a. This piston closes off the liquid in the work chamber 5a from the ambient with an annular-shaped seal 4a. A shaft 2 is attached (for example to a joint on a mirror which is not shown in the figure) to the piston 3a.

A piston 3b is also disposed on the compensation chamber 5b. This piston 3b, in turn, together with a circularly-shaped seal 4b separates the liquid in the compensation chamber 5b from the ambient.

Both pistons (3a, 3b) are connected to each other via a rigid bridge 9 so that the movement of the upper piston 3a is transmitted to the lower piston 3b.

If the shaft 2 now presses the upper piston 3a downwardly, then the volume of the work chamber 5a is reduced and liquid flows out from the feed or connecting line 7a into a supply vessel (not shown in the figure).

On the other hand, the movement of the shaft 2 toward the compensation chamber 5b is transmitted by the bridge 9 to the lower piston 3b so that the volume in the compensation chamber is increased and liquid flows into the compensation chamber 5b through the feed or connecting line 7b from a supply vessel (not shown in the drawing).

The operation of the support cell as such is described, for example, in EP 0,270,967.

The advantage of the solution of the invention is that the seal (8 in FIG. 2) between the two chambers (5a, 5b) and (5a', 5b') can be omitted. In this way, one seal 8 is not necessary and the hydraulic cross section of both chambers (5a, 5b) of the support cell 1 remains exactly identical.

Figure 3:
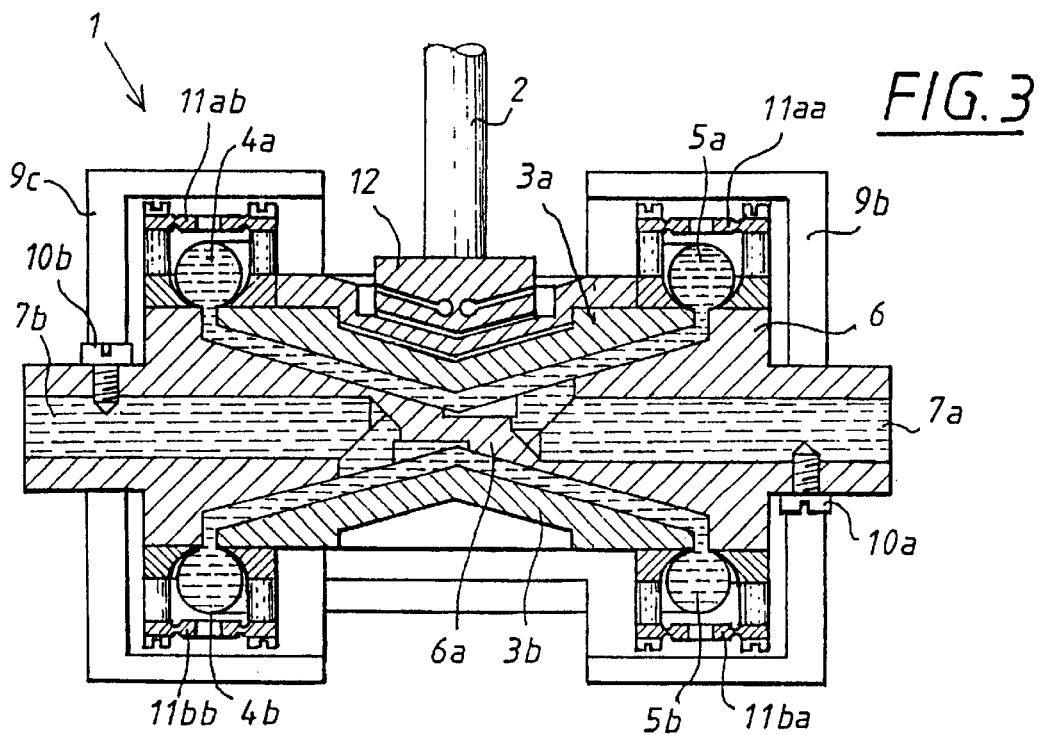
FIG. 3 is a realization of the support cell of the invention in lateral section.
Figure 4:
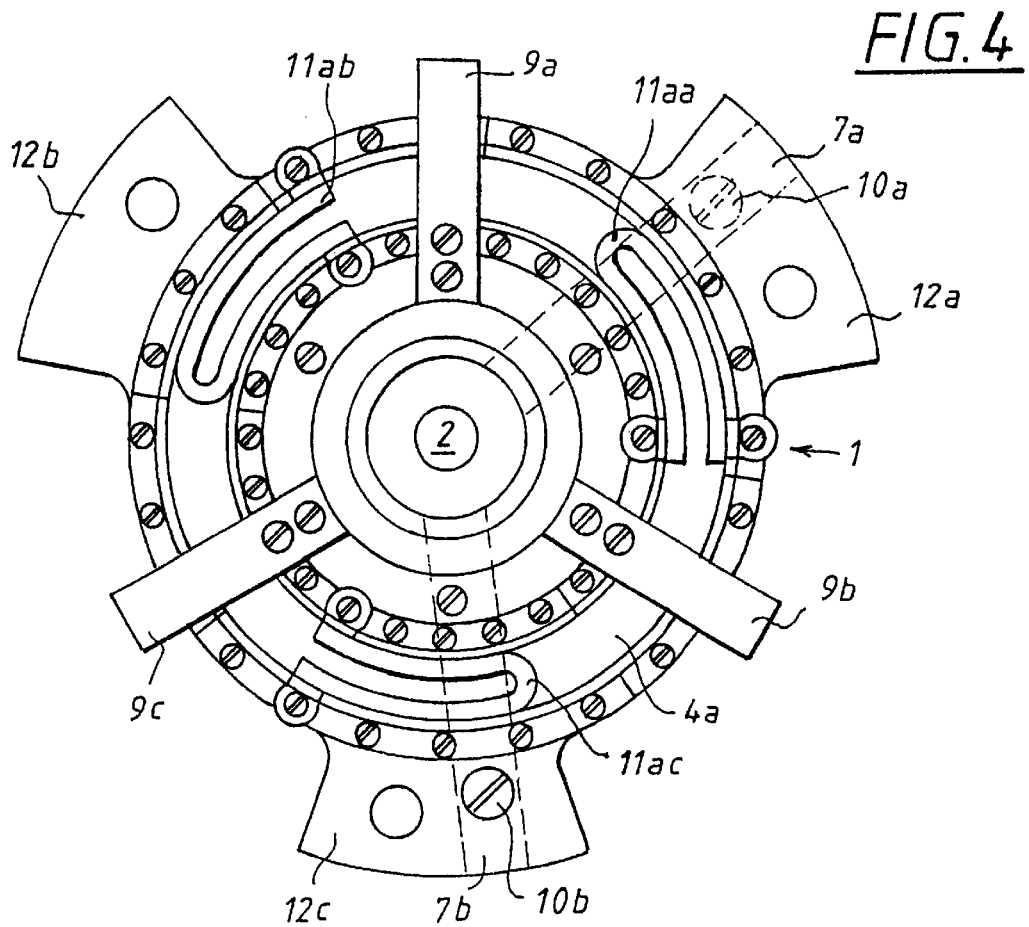
FIG. 4 is a plan view of the support cell of FIG. 3.

In FIG. 3, a support cell 1 of the invention is shown on an embodiment. FIG. 4 shows a plan view of the support cell shown in FIG. 3.

The support cell 1 has a work chamber 5a and a hydrostatic compensator chamber 5b. Both chambers (5a, 5b) have no (hydrostatic) "direct contact" to each other and are rigidly coupled to each other only by three rigid connecting bridges (9a, 9b, 9c) (with respect to movement). The connecting bridges (9a, 9b, 9c) act on the two pistons (3a, 3b).

A feed or connecting line 7a leads to chamber 5a and a feed or connecting line 7b leads to chamber 5b from a supply vessel (not shown) for hydraulic liquid. Respective venting screws (10a, 10b) are provided in the pipelines which serve as the feed and connecting lines (7a, 7b). After the screws (10a, 10b) are opened, the respective chambers (Sa, 5b) are vented thereby.

The housing 6 of the support cell 1 includes a rigid center part 6a which separates the two chambers (5a, 5b) from each other. Except for the housing 6, the work chamber 5a has an upper piston 3a as an outer end which is connected via a lateral seal 4a to the housing 6.

A shaft 2 is mounted on the upper piston 3a via a joint having orthogonal axes. This joint is configured as a solid state joint 12 and is comprised of crossed leaf springs. The shaft 2 leads to a joint on a support location on an astronomical mirror (not shown in the figure). The seal 4a is constructively configured as an omega torus.

As an outer end, the compensation chamber 5b has a lower piston 3b which is connected via a lateral seal 4b to the housing 6. The seal 4b is here also constructively configured as an omega torus.

Three leaf springs (11aa, 11ab, 11ac) are arranged above the seal 4a and three leaf springs (11ba, 11bb, 11bc) are arranged above the seal 4b.

Three lateral attachment bodies (12a, 12b, 12c) are located on the housing 6 for a reliable attachment of the support cell 1 to a base (not shown).

In a first application example, the use of support cells with thermal compensation is described. The solution of the invention shown in FIG. 5 makes it possible to use the compensating system, which is anyway present, for the hydrostatic pressure simultaneously to compensate the volume change of the oil in the work chamber 5a of the support cell 1 of the hydraulic system. The solution of the invention can be used together with a support cell of FIG. 1 or 2.

Figure 5:
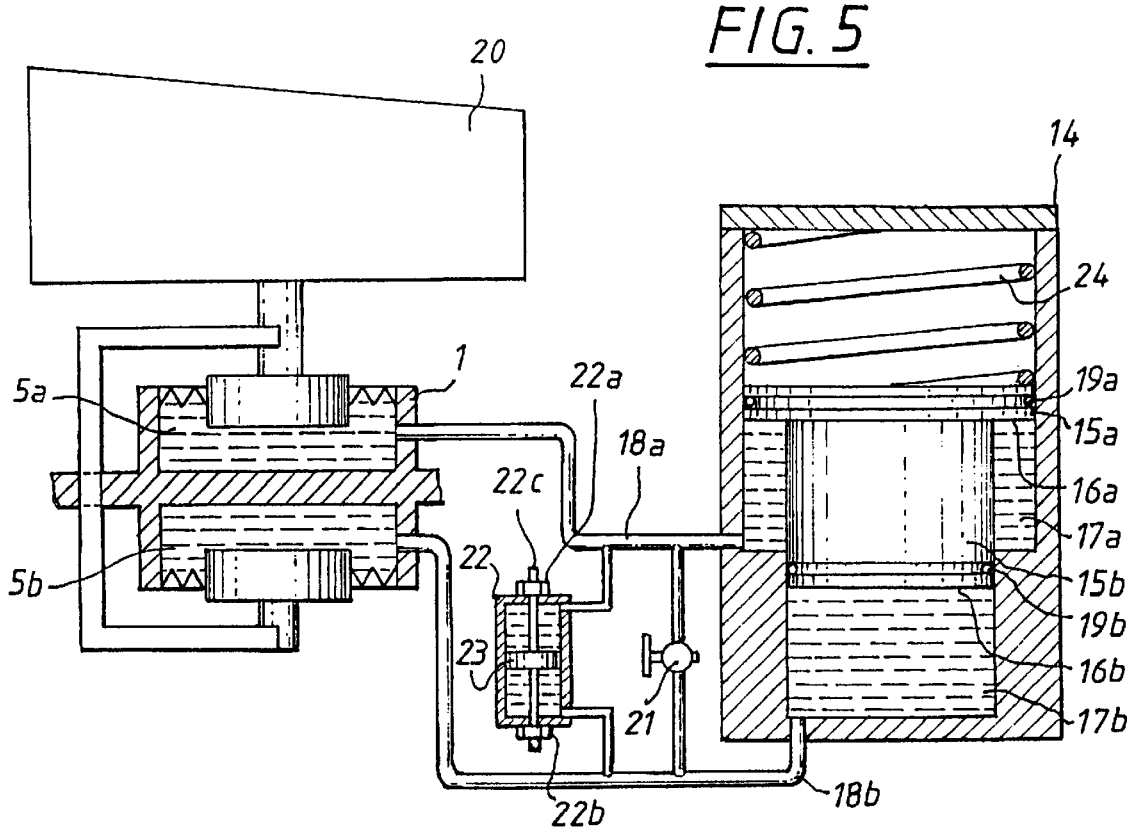
FIG. 5 is a thermal compensation device utilizing the support cell of the invention.

In a thermal compensation cell 14, the system includes two connected pistons (15a, 15b) (this is in lieu of the one in the conventional arrangement). The effective surfaces (16a, 16b) of the pistons (15a, 15b) are equal to each other. Hydraulically, the two chambers (17a, 17b) of FIG. 5 are so connected to the hydraulic support cell 1 that both chambers (17a, 17b) increase by the same amount with the temperature change of the oil insofar as the oil quantity in the work loop 18a is the same as the oil quantity in the compensation loop 18b. Seals (19a, 19b) ensure a reliable separation of the two compensation chambers (17a, 17b) or prevent the exiting of liquid from the upper chamber 17a.

The system operates as follows: the pretension spring 24 generates a constant prepressure in a completely closed system. This prepressure transmits also to the work chamber 5a of the support cell 1 insofar as the cell 1 is unloaded. The load of the mirror 20 increases the pressure in the work cell 5a in correspondence to the weight of the mirror. The total quantity of the oil, which is enclosed in the work loop 18a, determines the position of the mirror 20.

If, as a consequence of a temperature increase, the volume of the oil in the work loop 18a increases, then the oil volume increases in the compensation loop 18b, in which the compensation chamber 5b is disposed, by the same amount because the oil quantities are the same. In this way, the compensating piston 15a must lift by an amount x.

The compensating piston 15a and the pretension piston 15b are connected to each other. For this reason, the pretension piston 15b lifts by an amount x whereby the volume in the compensating chamber 17b is increased precisely by the amount by which the oil volume in the compensation loop 18b has increased. The mirror 20 therefore remains exactly in its position even though the oil volume in the two loops (18a, 18b) has increased.

The chambers (17a, 17b) in the thermal compensation cell 1 must be so dimensioned that the circular area 16b of the compensation piston 15b is the same as the circular ring surface 16a of the pretension piston 15a and that the maximum axial stroke x corresponds to the highest volume increase to be expected for a temperature increase.

A principle can be designed also for different oil volume in the loops (18a, 18b) and for different work media; however, this makes the simultaneous use as a hydrostatic compensation system more difficult.

A shut-off valve 21 is arranged between the two loops (18a, 18b). This shut-off valve 21, on the one hand, serves to fill the two loops (18a, 18b) with a hydraulic liquid and, on the other hand, makes possible a coarse adjustment between the two loops (18a, 18b).

Furthermore, an adjusting piston 22 is arranged between the two loops (18a, 18b) with which a fine adjustment can be undertaken.

For making a fine adjustment, one of the two fixing screws (22a, 22b) on the holding rod 22c of the partition disc 23 between the two chambers of the adjusting piston 22 is loosened and the other fixing screw (22a, 22b) is tightened. For this purpose, the holding rod 22c has an outer thread on respective ends which acts as a guide for the inner threads of the screws (22a, 22b).

The above explanations with respect to the thermal compensation system serve only as an explanation of the principle. The specific configuration of system assemblies can be different in the context of the state of the art.

In a further exemplary application, the use of the support cells as lateral supports will be described. The solution of the invention shown in FIG. 6 permits the reversal lever 25 to be so supported by hydraulic cells (27a to 27d, 28a to 28d) that its movement can be parallel to itself and the center joint is thereby unnecessary. Stated otherwise, the center joint is replaced by four additional hydraulic actuators (27a to 27d), which are arranged in a plane. In this way, one obtains a hydraulic lateral support as a parallel guide.

Figure 6:
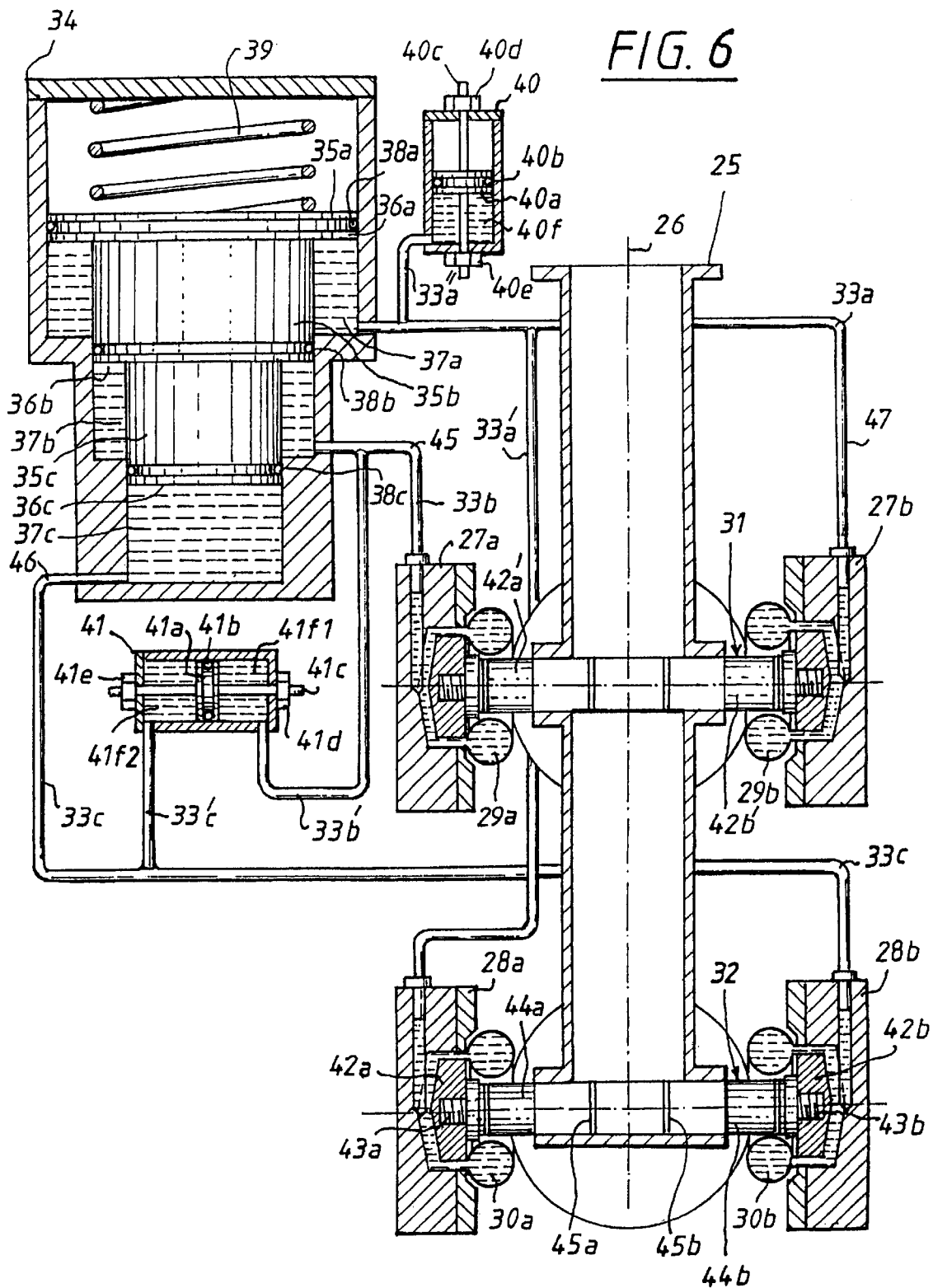
FIG. 6 is a hydraulic lateral support in the form of a parallel guide while using the support cell of the invention; and, FIG. 7 is a joint for the hydraulic lateral support shown FIG. 6.

FIG. 6 shows such an actuator arrangement on a reversal lever 25. Four cells (27a to 27d) are arranged in a first plane and four cells (28a to 28d) are arranged in a second plane. Four cells (two in each plane) operate in one of the two lateral directions and four cells (two in each plane) operate in the other one of the lateral directions. Only two cells in each plane are shown in FIG. 6 and act preferably at a spacing of the mirror cell thickness on the lever 25 which have an assembly corresponding to a half cell (work cell or compensation cell) of the support cells shown in FIG. 3.

The two cells (27b, 28a) shown to the right above and to the left below are directly connected to each other whereby a parallel movement of the lever 25 is compelled as long as the oil volume in the adjusting piston 40 for beam tilting is not changed.

The adjusting piston 40 serves to adjust the beam tilting and has a chamber 40f filled with the hydraulic liquid. If one wants to change the volume of the chamber 40f, then one loosens a screw (40d or 40e) having an internal thread and tightens the other screw (40e or 40d). The screws (40d or 40e) are mounted on the piston rod 40c having external threads at its ends. In this way, the piston 40a is displaced about which a seal 40b is arranged in order to prevent an unintended outflow of liquid.

If the oil volume is increased with this piston 40, then the beam 25 tilts toward the left or vice versa. A lateral load on the beam 25 at the elevation of the line of action 26 generates approximately twice the force in the upper cross as in the lower.

A hydraulically-operating lateral adjustment 41 is mounted between the two lower chamber (37b, 37c) of the temperature compensator 34. With this lateral adjustment 31, one can shift the beam 25 in one axis (in the figure, in the plane of the drawing perpendicular to the action line 26).

The lateral adjustment 41 has two chamber (41f1, 41f2) between which a displaceable piston 41a is mounted. The piston 41a is attached to a piston rod 41c. The ends of the piston rod 41c have external threads on which two screws (41d, 41e) having internal threads are threadably engaged. If one wants to change the position of the piston 41b in the lateral adjustment 41, then one loosens one of the two screws (41d, 41e) and tightens the opposite-lying screw (41e, 42d).

In all four illustrated cells (27a, 27b, 28a, 28b) having a torus membrane (29a, 29b, 30a, 30b), pressure change adjusts automatically and this pressure change holds the equilibrium with respect to the external force. The maximum external force is determined by the amount of the pretension in the temperature compensator 34 which can be designed as a maximum force limiter.

The temperature compensator 34 is so configured that the lower and center pistons (35a, 35b) have the same area (36a, 36b) but the upper piston 35c has twice the area 36c because this area must compensate also twice the number of actuator chambers. Seals (38a to 38c) are arranged about the pistons (35a to 35c) i order to separate the three hydraulic loops (45, 46, 47) from each other and prevent the exit of liquid.

The upper hydraulic loop 47 comprises the upper chamber 37a of the temperature compensator 34, the adjusting piston 40 for tilting the beam 25, the right cell 27b on the upper joint body 31, the left cell 28a on the lower joint body 32 as well as the corresponding connecting lines (33a, 33a', 33a").

The center hydraulic loop 45 comprises the center chamber 37b of the temperature compensator 34, the left cell 27a on the upper joint body 31 as well as the corresponding connecting lines (33b, 33b'). The center hydraulic loop 45 has a connection to the hydraulic loop 46 via the lateral adjustment 41. The loop 46 comprises the lower chamber 37c of the temperature compensator 34, the right cell 28b at the lower joint body 32 as well as the connecting lines (33c, 33c') corresponding thereto.

The chamber volumes of the lower and center chambers (37c, 37b) are the same size; whereas, the volume of the upper chamber 37a is twice as large as the volume of each of the individual volumes of the two other chambers (37b, 37c). All pistons (35a to 35c) are rigidly connected to each other and are loaded by a single pretension spring 39.

Each of the chambers (36a to 36c) of the compensator 34 can take up just so much oil as is displaced in the working loops (45 to 47) corresponding thereto because of a temperature increase. With a correct matching of the oil quantity, the position of the lever 25 remains completely unchanged for a temperature change; whereas, in contrast, the three compensating pistons (35a to 35c) shift together by the same amount.

Figure 7:
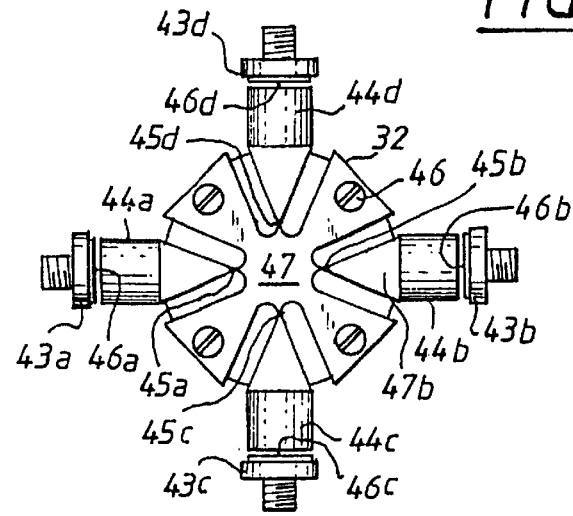

The embodiment of the connections of the illustrated four actuators (27a, 27b, 28a, 28b) in the two crosses is so selected that all pistons are connected to the beam 25 via a pressure rod or a joint body (31, 32) having respective joints (see also FIG. 7). In this way, forces can be transmitted to the beam in one direction; whereas, in the other direction, the beam 25 is decoupled by the movability of the joint bodies (31, 32).

In the plane perpendicular to the plane of the drawing which is not shown in the figure, a corresponding system having its temperature compensator, beam tipping adjustment and lateral adjustment must be provided in order to tilt or parallelly displace the beam 25 also in the other axis.

A complete mirror support for a main mirror of a mirror telescope in lateral direction can comprise several levers 25 in a parallel connection. The sum of all lateral movements of the levers 25 remains constant. Likewise, the sum of the tilting of all levers 25 is constant in the parallel circuit whereby the mirror load is uniformly distributed on all levers 25.

The temperature compensation element 34 is required only once in each oil loop (degree of freedom), that is, a total of six times with three for the axial support and three for the lateral support (two orthogonal directions and torsion via a two partition of one direction).

The lower joint body 32 is shown in FIG. 7. The lower joint body 32 is built the same way as the upper joint body 31 and is correspondingly connected to the particular actuators (27a, 27b, 28a, 28b).

The joint body 32 has a cross-shaped configuration when viewed in plan. Holders (43a to 43d) are mounted on the cross ends. The joint body 32 is tightly connected with these holders (43a to 43d) to the movable plate (42a to 42d) of the actuators (28a to 28d).

These holders (43a to 43d) are connected via solid joints (46a to 46d) to an intermediate body (44a to 44d). A further solid joint (45a to 45d) connects the intermediate bodies (44a to 44d) on the opposite-lying side to the base plate 47 of the joint body 32.

The base plate 47 is so configured that lateral movements of the intermediate body (44a to 44d) are possible in a limited angular range before the intermediate bodies (44a to 44d) come to a stop at the corresponding surface of the base body 47. The spacing between the holders (43a to 43d) and the intermediate bodies (44a to 44d) is so dimensioned that an undisturbed movement of the intermediate bodies (44a to 44d) is possible in the fixed angular range.

A friction-free support and holding of the beam 25 is ensured by the constructive configuration of the joint body 32. A relatively high ultimate strength of the beam 25 is ensured because of the form of the joints (46a to 46d as well as 45a to 45d) which are stiff parallel to the action line 26.

What is claimed is:

1. A hydraulic support cell assembly comprising:
   a hydraulic support cell defining a work chamber and a compensating chamber;
   a thermal compensation cell having first and second chambers;
   a first conduit for connecting said work chamber to said first chamber;
   a second conduit for connecting said compensating chamber to said second chamber;
   first and second pistons having first and second hydraulically effective surfaces for hydraulically pressing the hydraulic fluid in said first and second chambers, respectively; and,
   said first and second pistons being rigidly connected to each other and said hydraulically effective surfaces being equal.

2. The hydraulic support cell assembly of claim 1, wherein: one of said hydraulically effective surfaces defines a circular area and the other one of said hydraulically effective surfaces defines an annular area.

3. The hydraulic support cell assembly of claim 2, further comprising a spring for generating a defined pressure in said thermal compensation cell.

4. A hydraulic support cell assembly comprising:
   a hydraulic support cell defining a work chamber and a compensating chamber;
   said chambers being arranged coaxial to each other and defining respective hydraulic cross sections which are equal to each other;
   a supply vessel unit for holding a hydraulic fluid;
   first and second conduits connecting said work and compensating chambers, respectively, to said supply vessel unit for equalizing the hydrostatic pressure;
   said chambers conjointly defining a center plane therebetween;
   first and second pistons mounted in mirror image to said center plane in said work and compensating chambers, respectively, and first and second seals for sealing off said work and compensating chambers, respectively, from the ambient;
   a member for rigidly connecting said pistons to each other externally of said chambers; and,
   said chambers having respective sides facing away from said pistons and conjointly defining a rigid base plate at said sides.

5. The hydraulic support cell assembly of claim 4, said firs and second seals each having a torus shape.

6. The hydraulic support cell assembly of claim 5, said first and second seals being made of metal or radially reinforced rubber.

7. The hydraulic support cell assembly of claim 6, said torus-shaped seals having an omega-shaped cross section.

8. The hydraulic support cell assembly of claim 5, a first set of leaf springs being mounted above the first torus-shaped seal and a second set of leaf springs being mounted below the second torus-shaped seal.

9. The hydraulic support cell assembly of claim 4, further comprising first and second venting systems for said work and compensating chambers, respectively.

10. The hydraulic support cell assembly of claim 4, further comprising an orthogonal joint on the piston of said work chamber; and, a shaft connected to said piston via said orthogonal joint.

11. The hydraulic support cell assembly of claim 4, further comprising a reversing lever; and, said first and second piston being connected to said reversing lever at mutually opposite en thereof.

12. The hydraulic support cell assembly of claim 11, said hydraulic support cell being a first hydraulic support cell and said assembly further comprising a second hydraulic support cell; and, said first and second support cells being arranged crosswise in a plane.

13. The hydraulic support cell assembly of claim 4, further comprising a shaft and said member being a wrap-around bridge for connecting said pistons to each other; and, said hydraulic support cell being connected to said shaft to axially support said shaft.

* * * * *

UNITED STATES PATENT AND TRADEMARK OFFICE
CERTIFICATE OF CORRECTION

PATENT NO. : 6,265,654 B1
DATED : July 24, 2001
INVENTOR(S) : Hans-Juergen Meier It is certified that error appears in the above-identified patent and that said Letters Patent is hereby corrected as shown below:

Column 1,
Line 64, delete "b" and substitute -- be -- therefor.

Column 2,
Lines 40 and 41, delete "Further advantageous embodiments of the invention are described in the dependent claims".

Column 3,
Line 52, between "chamber" and "is" insert -- 5b --.

Column 4,
Line 10, delete "Sa" and substitute 5a -- therefor .
Line 41, delete "FIG." and substitute -- FIGS. -- therefor.

Column 5,
Line 10, delete "1" and substitute -- 14 -- therefor.
Line 15, delete "volume" and substitute -- volumes -- therefor.

Column 6,
Line 38, delete "i" and substitute -- in -- therefor.

Column 7,
Line 11, between "its" and "temperature" insert -- own --.

Column 8,
Line 34, delete "firs" and substitute -- first -- therefor.
Line 55, delete "en" and substitute -- ends -- therefor.

Signed and Sealed this

Ninth Day of July, 2002

*Attest:*

JAMES E. ROGAN
*Attesting Officer*     *Director of the United States Patent and Trademark Office*